US006723970B1

(12) United States Patent
Whipple, Jr.

(10) Patent No.: US 6,723,970 B1
(45) Date of Patent: Apr. 20, 2004

(54) VENTILATION SYSTEM FOR A COOKING APPLIANCE

(75) Inventor: Robert Z. Whipple, Jr., Louden, TN (US)

(73) Assignee: Maytag Corporation, Newton, IA (US)

(*) Notice: Subject to any disclaimer, the term of this patent is extended or adjusted under 35 U.S.C. 154(b) by 0 days.

(21) Appl. No.: 10/351,405

(22) Filed: Jan. 27, 2003

(51) Int. Cl.[7] .............................. H05B 6/80; A21B 1/26

(52) U.S. Cl. ........................ 219/681; 219/400; 219/757; 126/21 A

(58) Field of Search ................................. 219/681, 682, 219/685, 757, 400, 401; 126/21 A, 21 R

(56) References Cited

U.S. PATENT DOCUMENTS

| | | | | |
|---|---|---|---|---|
| 4,184,945 A | * | 1/1980 | Morgan et al. | 219/757 |
| 4,430,541 A | | 2/1984 | Day, Jr. | |
| 4,802,459 A | | 2/1989 | McFadden et al. | |
| 5,406,932 A | | 4/1995 | Joseph et al. | |
| 5,674,425 A | * | 10/1997 | Hong | 219/681 |
| 5,918,589 A | | 7/1999 | Valle et al. | |
| 6,344,637 B2 | * | 2/2002 | Lee et al. | 219/757 |

* cited by examiner

*Primary Examiner*—Philip H. Leung
(74) *Attorney, Agent, or Firm*—Diederiks & Whitelaw, PLC

(57) ABSTRACT

A cooking appliance includes an oven cavity and a forced air convection system having a convection fan, a heating element and a ventilation system including a duct. The duct includes a first compartment adapted to receive an oven air flow, a second compartment adapted to receive an exhaust air flow, and an air inlet opening into each of the first and second compartments, wherein an incoming air flow is introduced into each of the first and second compartments through operation of a fan assembly. According to one aspect of the invention, the incoming air flow combines with the oven air flow prior to passing over a convective heat element. As such, the combined air flow is heated combusting food byproducts contained therein. In accordance with another aspect of the present invention, the incoming air flow is combined with the exhaust air flow, lowering the temperature of the exhaust prior to release to the surroundings.

25 Claims, 3 Drawing Sheets

VENTILATION SYSTEM FOR A COOKING APPLIANCE

BACKGROUND OF THE INVENTION

1. Field of the Invention

The present invention pertains to the art of cooking appliances and, more particularly, a cooking appliance including a forced-air convection system having a partitioned duct assembly adapted to mix a plurality of air flows within the appliance.

2. Discussion of the Prior Art

In general, cooking appliances that perform a cooking process using a forced air convection air flow are known. Typically, forced air convection systems direct a heated air flow into an oven cavity. In operation, the heated air flow circulates about the oven cavity and impinges upon the food item to perform the cooking process. Of the many design considerations that must be accounted for when designing forced air systems, ventilation is perhaps the most important.

There are two key factors to be considered in the design of an oven ventilation system. The first is the volumetric flow rate of a re-circulating air flow. If the air flow rate is too high, cooking performance is compromised and, in addition, the time required to pre-heat the oven is increased. The higher the flow rate, the more difficult it is to transfer thermal energy into the air flow to raise the temperature of the convection air stream. Accordingly, the prior art is replete with examples of forced air convection ovens requiring secondary heating systems. Additional heating elements are often placed either below or in a bottom portion of the oven cavity to serve as an additional heat source for raising the temperature of convection air streams to the appropriate level.

The second key factor in the design of a ventilation system is the conditioning of the exhaust air flow temperature. If the exhaust air flow is too hot, then ventilation components must be designed to prevent high temperatures from transferring to surrounding cabinetry or to other areas of the appliance or the kitchen. Also, an exhaust air flow that is maintained at too high a temperature will lower the efficiency of the oven by carrying off a portion of the heat required for cooking. Therefore, heat exiting the oven in the exhaust must be replaced in order to maintain an uniform cooking environment.

Alternatively, too low an exhaust air flow, and deposits begin to form on the surfaces of the ventilation system. During cooking, food byproducts in the form of fats, grease and the like enter the forced air flow. These byproducts can accumulate on the surfaces of the ventilation system and, in the presence of a low exhaust air flow, develop into smoke which could ultimately enter into kitchen areas. Accordingly, the ventilation system must be designed to reduce the amount of food byproducts entering the air flow such that the remainder can be easily carried from the system.

The prior art includes several examples of ventilation systems which attempt to mitigate the problems associated with the accumulation of food byproducts. In general, manufacturers have designed systems that maintain the byproducts solely within the cooking chamber. In this fashion, grease build-up in the ventilation system is minimized. However, these designs require shorter intervals between cleaning operations in order to maintain the thermal efficiency of the oven. Other designs require the incorporation of a catalyst material which serves to enhance the combustion of the byproducts. While the use of a catalyst can be effective, it adds to the overall cost of the appliance.

Accordingly, there exists a need in the art for a cooking appliance including a forced air convection venting system that will enable a more efficient thermal transfer between heating components and the air flow.

Particularly, there exist a need for a ventilation system that can reduce the air flow rate and, in addition, condition the temperature of the exhaust air flow.

SUMMARY OF THE INVENTION

The present invention is directed to a cooking appliance including an oven cavity and a forced air convection system having a convection fan, a heating element and a duct assembly. Specifically, the duct assembly includes an oven air inlet portion and an incoming air inlet portion. The oven air inlet portion is partitioned into first and second compartments adapted to receive both an incoming and oven air flows.

In accordance with a preferred form of the invention, the cooking appliance performs a convective cooking process through operation of the fan assembly at a convection fan speed. In this manner, oven and incoming air flows are combined in the first compartment prior to being passed into the forced air convection system and over the heating element to establish a heated, convective air flow. At this point, the heated air flow is introduced into the oven cavity. Similarly, the oven and incoming air flows are combined in the second compartment to form a tempered exhaust air flow which is subsequently carried from the cooking appliance through associated exhaust ducting.

In a preferred form of the invention, the first compartment is constituted by ⅔ the overall cross-sectional area of the duct assembly and the second compartment by the remaining one third. In this manner, a controlled, mixed product of the oven and incoming air flows moderates the temperature of the incoming air while, at the same time, maximizing the volume of air passing over the heating element. With this arrangement, the presence of smoke and smoke generating byproducts are substantially eliminated from the oven air flow without the need for a catalyst.

In further accordance with the preferred embodiment, the cooking appliance of the present invention includes a convection baking function. Specifically, in a bake mode, the convection fan is operated at less than half the normal convection cooking speed to enhance the overall thermal conductivity between the heating element and the recirculating air flow. Most preferably, the convection fan is operated at approximately one-quarter the convection fan speed such that a uniform heating environment is established within the oven cavity. In this manner, a food item can undergo a baking process without being exposed to the higher speed air typically associated with convection cooking. This arrangement eliminates the requirement for an additional baking element, typically arranged either on or below a lower portion of the oven cavity.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
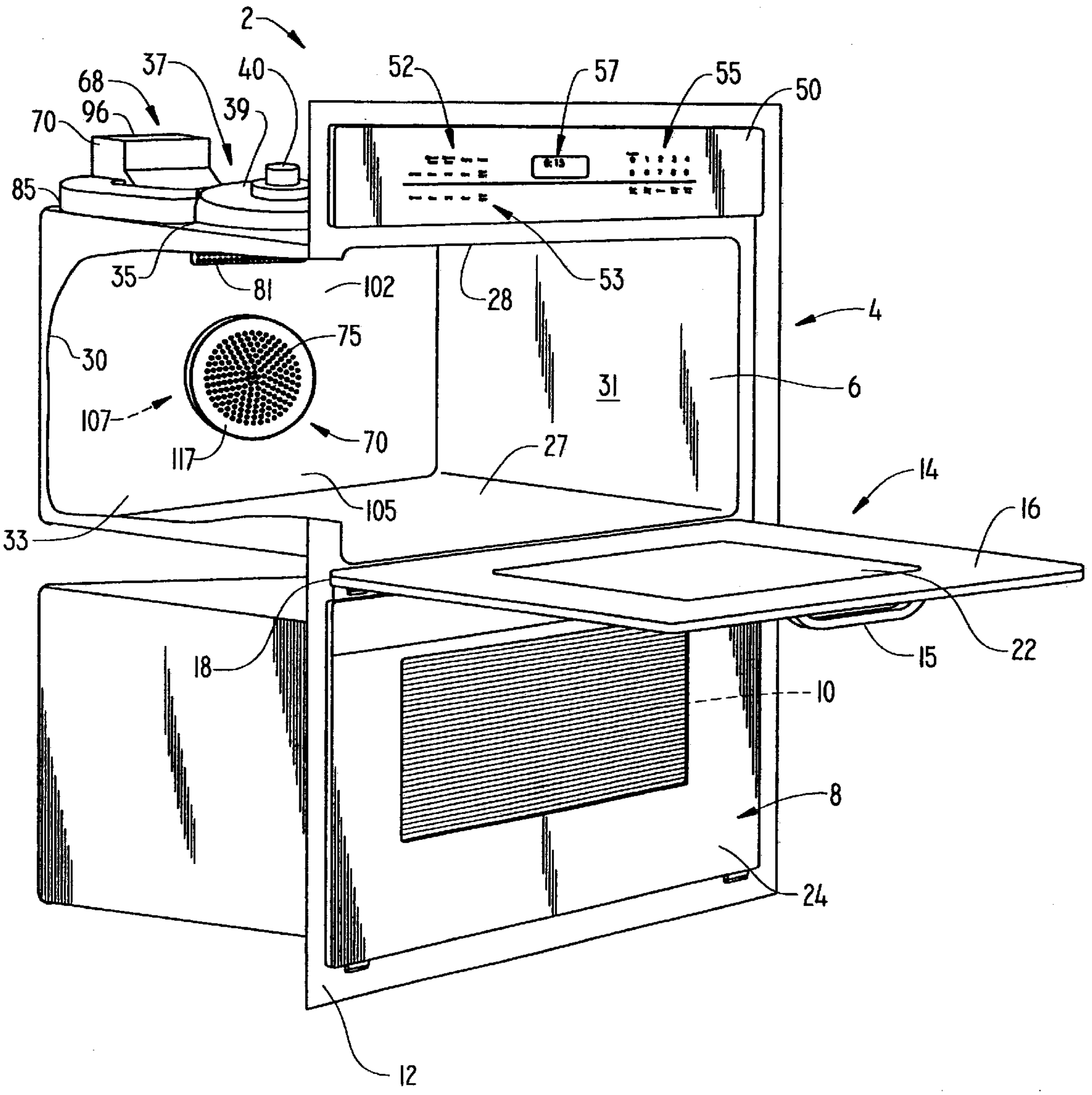
FIG. 1 is a perspective, partially cut-away view of a wall oven including a ventilation system constructed in accordance with the present invention.

With initial reference to FIG. 1, a cooking appliance constructed in accordance with the present invention is generally shown at 2. The invention is shown in connection with cooking appliance 2 depicted as a dual wall oven. However, it should be understood that the present invention is not limited to this model type and can be incorporated into various types of oven configurations, e.g., cabinet mounted ovens and both free-standing and slide-in ranges. In the embodiment shown, cooking appliance 2 includes an upper oven 4 having upper oven cavity 6 and a lower oven 8 having an associated lower oven cavity 10. In the preferred embodiment, upper oven 4 is provided to perform a combination microwave/convection cooking process, and lower oven 8 is provided to perform a standard cooking operation. As shown, cooking appliance 2 includes an outer frame 12 which, in the present configuration, supports both upper oven 4 and lower oven 8 within a cabinet or wall structure (not shown).

In a manner known in the art, a door assembly 14 is provided to selectively provide access to upper oven cavity 6. As shown, door assembly 14 is provided with a handle 15 at an upper portion 16 thereof and is adapted to pivot at a lower portion 18 to enable selective access to within oven cavity 6. In a manner also known in the art, door 14 is provided with a transparent zone 22 for viewing the contents of oven cavity 6 when door 14 is closed. In addition, a seal (not shown) is provided about a peripheral edge of door assembly 14 to prevent oven gases from escaping from oven cavity 6. In a similar arrangement, a second door assembly 24 is provided for lower oven 8.

As best seen in FIG. 1, oven cavity 6 is defined by a smooth bottom portion 27, an upper portion 28, opposing side portions 30 and 31, and a rear portion 33. In the preferred embodiment, located on an exterior surface portion 35 of upper oven 4 is a microwave cooking system generally indicated at 37. In general, microwave cooking system 37 includes a waveguide 39 having arranged thereon a microwave emitter or magnetron 40. As further shown in FIG. 1, cooking appliance 2 includes an upper control panel 50 arranged above upper oven 4 and carried at least partially by frame 12. In the embodiment shown, control panel 50 includes first and second rows of oven control buttons 52 and 53 for programming, in combination with a numeric pad 55 and a display 57, particular cooking operations for upper and lower ovens 4 and 8 respectively. Since the general programming of cooking appliance 2 is known in the art and does not form part of the present invention, these features will not be discussed further here. In general, the structure described above with respect to cooking appliance 2 is already known in the art and does not constitute part of the present invention. Therefore, this structure has only been described for the sake of completeness. Instead, the present invention is particularly directed to a ventilation system for conditioning a recirculation air flow, lowering the temperature of exhaust gases, and reducing the amount of smoke generated by the operation of oven 4.

Figure 2:
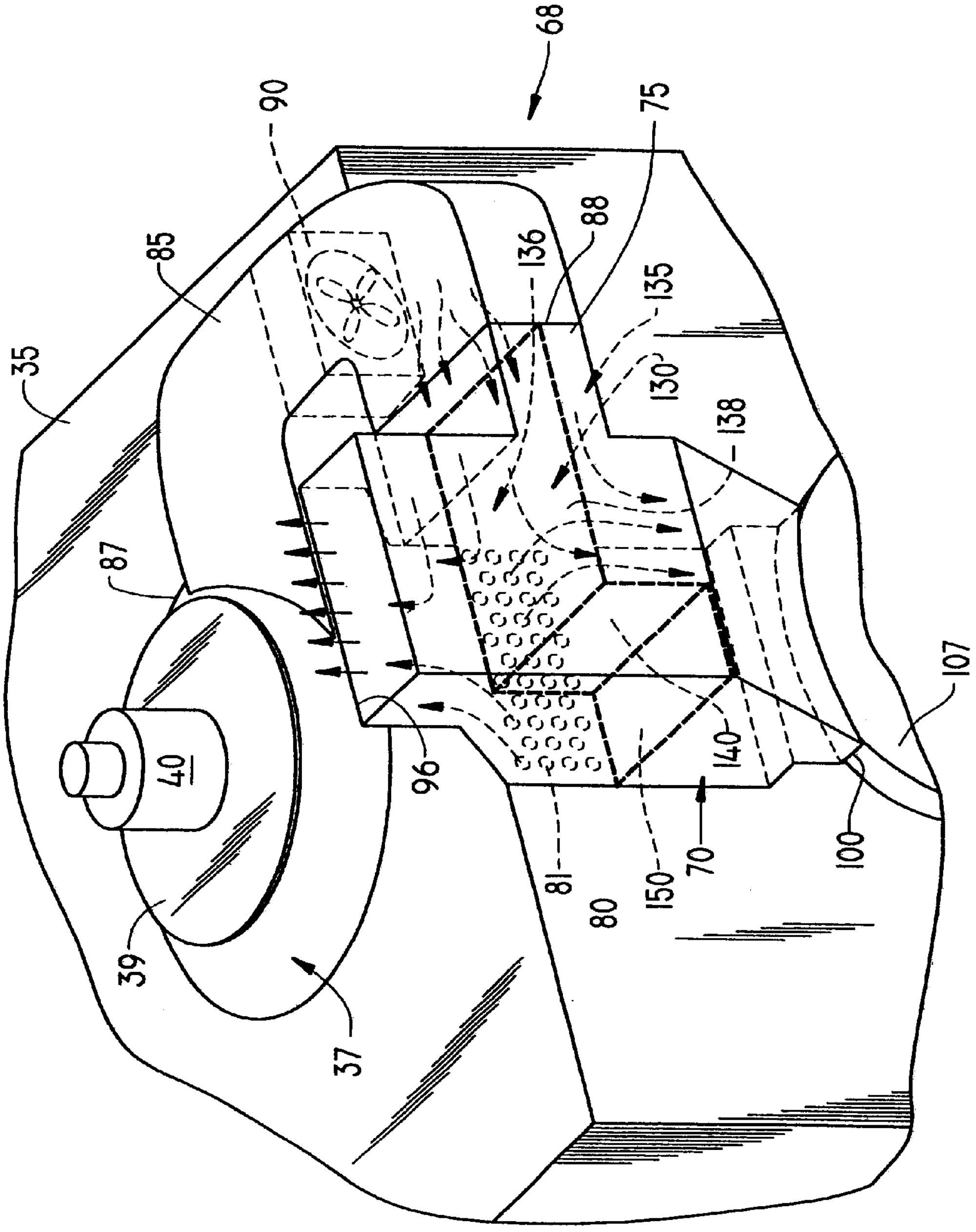
FIG. 2 is a partial upper rear perspective view of the wall oven of FIG. 1, illustrating the ventilation system mounted in accordance with the present invention.

Referring to FIG. 2, a ventilation system constructed in accordance with the present invention is generally indicated at 68. In the preferred embodiment shown, ventilation system 68 includes a vent unit 70 having a first inlet portion 75 and a second inlet portion 80 constituted by a plurality of inlet openings 81. In accordance with one form of the invention, an inlet air duct 85, including a first end 87 interconnected with waveguide 37 and a second end 88 opening into inlet portion 75, supplies an incoming air flow to vent unit 70. More specifically, arranged within inlet duct 85 is a fan assembly 90 which, when activated, withdraws air from waveguide 37. With this arrangement, incoming air either entering waveguide 37 through an inlet opening (not shown) or, alternatively, through an incoming air inlet located upstream of fan assembly 90 (also not shown) is directed into vent unit 70.

In accordance with the most preferred form of the invention, vent unit 70 includes an exhaust outlet 96 for directing an exhaust air flow from oven cavity 6 to the surroundings. In a manner known in the art, exhaust gases are ducted into portions of the kitchen or, alternatively, to outside the dwelling. As will be discussed more fully below, arranged in a lower portion of vent unit 70, opposite exhaust outlet 96, is a recirculating air outlet portion 100. More specifically, air outlet portion 100 opens into a convection fan assembly 107 which develops convective air currents within oven cavity 6. In accordance with the most preferred form of the invention, a heating element 115 (schematically illustrated in FIG. 3) is arranged within convection fan assembly 107 wherein, when activated, heating element 115 supplies heat energy to the flow of air prior to introduction into oven cavity 6. As best seen in FIG. 1, the heated air flow is directed into oven cavity 6 through a vented cover or oven cavity outlet illustrated at 117.

As best seen in FIG. 2, vent unit 70 has arranged therein a partition or divider element 130 which separates vent unit 70 into first and second portions or compartments 135 and 136. More specifically, divider 130 includes a first segment 138 that extends from first inlet portion 75 to approximately a midpoint of second inlet portion 80 and is positioned above the plurality of inlet openings 81. Projecting downward from first segment 138 is a second segment 140 which effectively divides the plurality of inlet openings 81 into first and second portions 135 and 136. At this point, divider element 130 terminates in a third segment 150 which extends to, and interconnects with, an opposing side wall of vent unit 70. With this arrangement, and as will be set forth more fully below, first and second portions 135 and 136 establish an incoming air flow portion and an exhaust air flow portion respectively.

Figure 3:
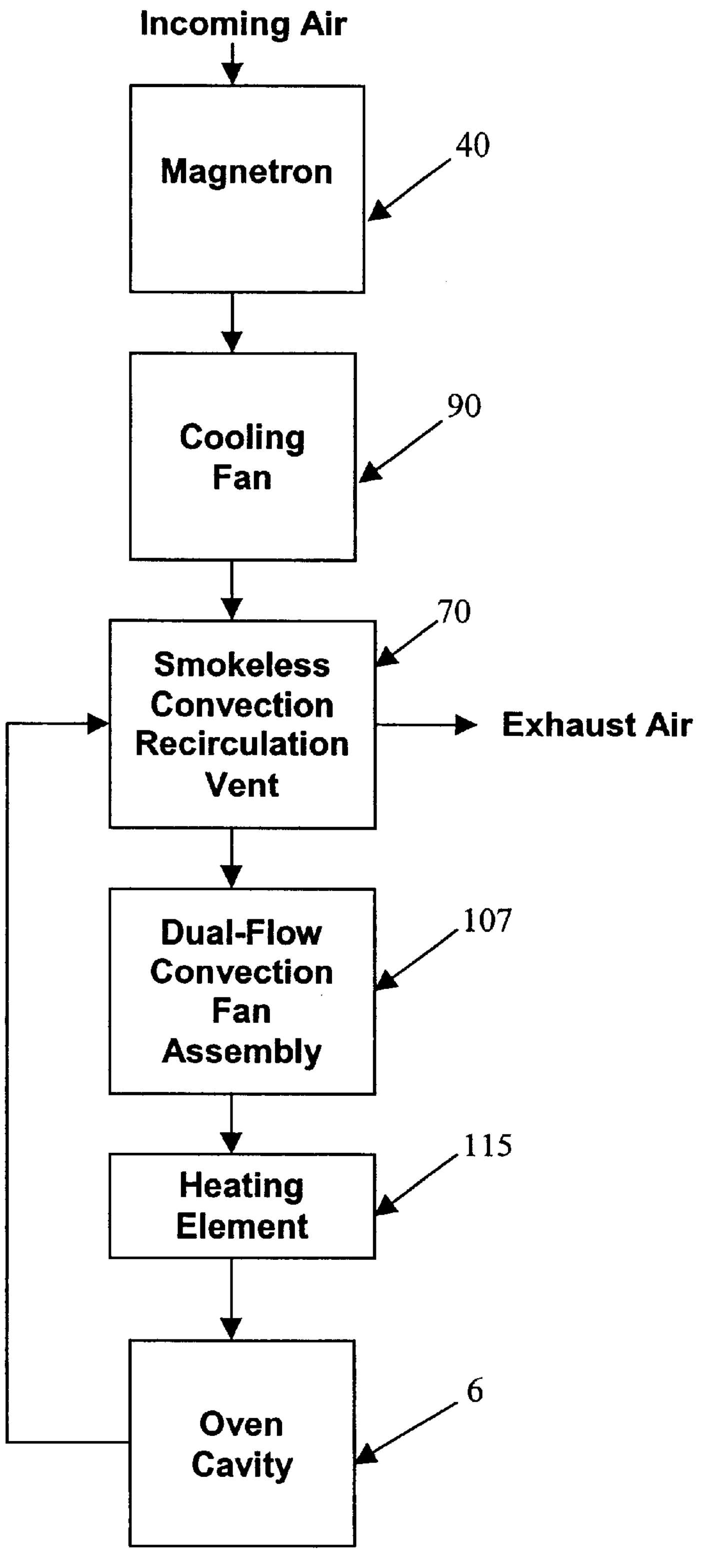
FIG. 3 is a flow diagram illustrating a particular air flow path through the ventilation system of the present invention.

Having described the preferred construction of ventilation system 68, the preferred method of operation will be set forth with particular reference to FIGS. 2 and 3. Upon selection of a desired convection cooking process, convection fan assembly 107 is operated at a convection cook speed to establish a convective air flow into oven cavity 6. Simultaneously, fan assembly 90 is activated to draw air through inlet duct 85 into first portion 135 of vent unit 70 in order to provide a flow of incoming air to convection fan assembly 107. In accordance with the most preferred form of the invention, convection fan assembly 107 constitutes a dual flow blower assembly which, when operated, mixes the incoming or cooling air stream directed through first portion 135 of vent unit 70 with an air stream of re-circulated oven gas directed through second inlet portion 80 in order to form a combined air flow. Through this arrangement, the air entering from inlet duct 85 serves to moderate the temperature and maximize the volume of the re-circulated oven gases.

Still in accordance with this most preferred form of the invention, once formed, the combined air flow is passed over heating element 115 in order to remove cooking effluents and other smoke generating particles which could ultimately be directed into the kitchen in the form of smoke when door 14 is opened. In addition, to reduce the production of smoke, vent unit 70 also conditions the exhaust gases generated within oven cavity 6. As best seen in FIG. 2, second compartment 136 constitutes an exhaust gas conditioning portion of vent 70. With this arrangement, a portion of the oven gases entering into vent unit 70 are directed into second compartment 136 through respective ones of the plurality of openings 81. More specifically, exhaust gases directed into second compartment 136 mix with a portion of incoming air flow from duct 85. The cooler, incoming air tempers and/or moderates the overall temperature of the exhaust air flow such that it can be directed from cooking appliance 2 without having any detrimental effects to surrounding structure.

In addition to the above described convection cooking process, cooking appliance 2 is capable of operating in a convection bake mode. In this mode, convection fan assembly 107 is preferably operated at one quarter of the fan speed typically associated with convection cooking. The lower fan speed reduces the overall air flow and associated high speed air currents associated with convection cooking within oven cavity 6. This reduced air flow has been found to establish a highly uniform baking environment without requiring a separate bake or heating element within cooking appliance 2.

Although described with reference to a preferred embodiment of the invention, it should be readily understood that various changes and/or modifications can be made to the invention without departing from the spirit thereof. For instance, in the most preferred form of the invention, first portion 135 receives approximately ⅔ of the overall volumetric flow of oven gases while second portion 136 receives the remaining ⅓. However, it should be understood that this volumetric flow can be varied based upon the particular geometries of the appliance. In this manner, the overall flow rates of the oven gases can be controlled or established for a particular demand or oven geometries. In addition, locating the ventilation system on the rear of the oven is done for illustrative purposes only, as other locations about the appliance are equally acceptable. In general, the invention is only intended to be limited by the scope of the following claims.

I claim:

1. A cooking appliance comprising:

an oven cavity;

a forced air convection system exposed to the oven cavity for performing at least a portion of a cooking process, said forced air system including at least a fan assembly and a heating element;

a duct assembly fluidly interconnected with the forced air convection system, said duct assembly having at least an oven air inlet portion being adapted to receive an oven air flow, an incoming air inlet portion being adapted to receive an incoming air flow and an exhaust outlet for directing an exhaust air flow from the cooking appliance; and a partition member separating the duct assembly into first and second compartments, each of said first and second compartments being adapted to receive both the oven and incoming air flows, wherein a first portion of the oven and incoming air flows combine in the first compartment to establish a convection air flow which passes over the heating element and is subsequently re-introduced into the oven cavity, and wherein a second portion of the oven and incoming air flows combine in the second compartment to establish an exhaust air flow directed from the cooking appliance.

2. The cooking appliance as recited in claim 1, wherein the partition member partially extends into the incoming air inlet portion.

3. The cooking appliance as recited in claim 1, further comprising: a microwave cooking system adapted to selectively perform a portion of the cooking process, said microwave cooking system including at least a waveguide and a magnetron for generating an RF energy field directed into the oven cavity through the waveguide.

4. The cooking appliance as recited in claim 3, further comprising: an incoming air duct interconnecting the microwave cooking system with the duct assembly, said incoming air duct being adapted to direct the incoming air flow from the waveguide to the partition of the duct assembly.

5. The cooking appliance as recited in claim 4, further comprising: a fan assembly arranged within the incoming air duct.

6. The cooking appliance as recited in claim 4, wherein the microwave cooking system is mounted to a top portion of the oven cavity.

7. The cooking appliance as recited in claim 6, wherein the forced air convection system in mounted to a rear portion of the oven cavity.

8. The cooking appliance as recited in claim 1, wherein the partition member includes a first segment extending from the incoming air inlet portion above the oven air inlet opening.

9. The cooking appliance as recited in claim 8, wherein the partition member includes a second segment extending from the first segment and bisecting the oven air inlet opening.

10. The cooking appliance as recited in claim 9, wherein the partition member includes a third segment extending from the second segment and terminating at a sidewall portion of the duct assembly.

11. The cooking appliance as recited in claim 9, wherein the partition member directs greater than half of the oven air flow into the first compartment.

12. A cooking appliance comprising:

an oven cavity;

a forced air convection system exposed to the oven cavity for performing at least a portion of a cooking process, said forced air system including at least a fan assembly and a heating element;

a duct assembly fluidly interconnected with the forced air convection system, said duct assembly including an incoming air inlet and an oven air inlet opening;

a partition member, positioned in the duct assembly, dividing said duct assembly into first and second compartments adapted to receive an oven air flow through the oven air inlet opening, said first compartment constituting an oven gas recirculation side and said second compartment constituting an exhaust gas outlet side, said incoming air inlet of said duct assembly opening into each of the first and second compartments, wherein an incoming air flow is introduced into each of the first and second compartments to condition a temperature of each of oven and exhaust gases respectively.

13. The cooking appliance as recited in claim 12, wherein the partition member includes a first segment extending from the incoming air inlet to above the oven air inlet opening.

14. The cooking appliance as recited in claim 13, wherein the partition member includes a second segment extending from the first segment and bisecting the oven air inlet opening.

15. The cooking appliance as recited in claim 14, wherein the partition member includes a third segment extending from the second segment and terminating at a sidewall portion of the duct assembly.

16. The cooking appliance as recited in claim 14, wherein the partition member directs greater than half of the oven air flow into the first compartment.

17. The cooking appliance as recited in claim 12, further comprising: a microwave cooking system adapted to selectively perform a portion of the cooking process, said microwave cooking system including at least a waveguide and a magnetron for generating an RF energy field directed into the oven cavity through the waveguide.

18. The cooking appliance as recited in claim 17, further comprising: an incoming air duct interconnecting the microwave cooking system with the duct assembly, said incoming air duct being adapted to direct the incoming air flow from the waveguide to the partition of the duct assembly.

19. The cooking appliance as recited in claim 18, further comprising: a fan assembly arranged within the incoming air duct.

20. A method of performing a convection cooking process in an appliance having an oven cavity, a forced air convection system including a fan, and a duct assembly including first and second compartments comprising:

introducing a first, heated air flow from the oven cavity into each of the first and second compartments;

directing a second, incoming air flow into each of the first and second compartments such that the incoming air flow mixes with and conditions the oven air flow creating first and second tempered air flows;

delivering the first tempered air flow past a convective heating element;

introducing the heated first tempered air flow into the oven cavity; and exhausting the second tempered air flow from the cooking appliance.

21. The method according to claim 20, further comprising: activating a fan assembly, positioned in the duct assembly, to draw the incoming air flow into the first and second compartments.

22. The method according to claim 21, further comprising:

operating the fan assembly at a first speed when performing a convection cooking operation in the oven cavity; and operating the fan assembly at a second, reduced speed when performing a convection baking operation in the oven cavity.

23. The method according to claim 22, wherein the fan assembly is operated at less than half the first speed when performing the convection baking operation.

24. The method according to claim 21, further comprising: drawing the incoming air flow, when the fan assembly is activated, from a waveguide of a microwave cooking system of the appliance.

25. The method according to claim 20, further comprising: directing the incoming air flow into each of the first and second compartments by directing the incoming air flow to a partition which is arranged in the duct assembly and, at least in part, defines the first and second compartments.

* * * * *